(12) United States Patent
Yu et al.

(10) Patent No.: US 11,126,546 B2
(45) Date of Patent: Sep. 21, 2021

(54) GARBAGE DATA SCRUBBING METHOD, AND DEVICE

(71) Applicant: Huawei Technologies Co., Ltd., Shenzhen (CN)

(72) Inventors: Chao Yu, Nanjing (CN); Hao Chen, Nanjing (CN); Bifeng Tong, Nanjing (CN); Chengliang Zheng, Shanghai (CN); Xiyu Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/754,537

(22) PCT Filed: Oct. 13, 2017

(86) PCT No.: PCT/CN2017/106200
§ 371 (c)(1),
(2) Date: Apr. 8, 2020

(87) PCT Pub. No.: WO2019/071620
PCT Pub. Date: Apr. 18, 2019

(65) Prior Publication Data
US 2020/0349069 A1 Nov. 5, 2020

(30) Foreign Application Priority Data
Oct. 9, 2017 (CN) .......................... 201710931551.3

(51) Int. Cl.
G06F 12/02 (2006.01)
G06F 16/17 (2019.01)
G06F 12/10 (2016.01)

(52) U.S. Cl.
CPC .......... *G06F 12/0253* (2013.01); *G06F 12/10* (2013.01); *G06F 16/1727* (2019.01); *G06F 2212/1044* (2013.01)

(58) Field of Classification Search
None
See application file for complete search history.

(56) References Cited

U.S. PATENT DOCUMENTS 8,862,923 B1 * 10/2014 Leung ................... G06F 3/0607
                                                            713/324
2006/0184720 A1   8/2006 Sinclair et al.
(Continued)

FOREIGN PATENT DOCUMENTS

CN   102332005 A   1/2012
CN   102511044 A   6/2012
(Continued)

OTHER PUBLICATIONS

Xia, D., "Analysis and Performance Optimization of Garbage Collection Algorithm in Dalvik Virtual Machine," Southeast University, 2015, 3 pages.

*Primary Examiner* — Jared I Rutz
*Assistant Examiner* — Marwan Ayash
(74) *Attorney, Agent, or Firm* — Conley Rose, P.C.

(57) ABSTRACT

This application provides a garbage data scrubbing method and a device, and relates to the field of terminals, to resolve a problem that delivering a discard message in a file system transaction affects a user foreground operation. The method includes: obtaining an IO busy/idle status of a terminal at a current moment, where the IO busy/idle status includes a busy state and an idle state (S301); and if the IO busy/idle status of the terminal at the current moment is the idle state, delivering a discard message to a storage device (S302), where the discard message includes an initial address and a size of to-be-scrubbed physical space in the storage device, and the discard message is used to unbind a mapping relationship between a physical address of the to-be-scrubbed physical space and a corresponding logical address.

18 Claims, 4 Drawing Sheets

(56) References Cited

U.S. PATENT DOCUMENTS

| | | | | |
|---|---|---|---|---|
| 2010/0169683 A1* | 7/2010 | Wang | .................... | G06F 1/3287 |
| | | | | 713/323 |
| 2011/0047322 A1* | 2/2011 | Allen | .................... | G11C 16/10 |
| | | | | 711/103 |
| 2013/0040702 A1 | 2/2013 | Sherman et al. | | |
| 2013/0124785 A1* | 5/2013 | Xiong | ................. | G06F 21/6245 |
| | | | | 711/103 |
| 2013/0124787 A1* | 5/2013 | Schuette | ............ | G11C 16/0483 |
| | | | | 711/103 |
| 2013/0159609 A1* | 6/2013 | Haas | ................... | G06F 12/0253 |
| | | | | 711/103 |
| 2014/0032817 A1 | 1/2014 | Bux et al. | | |
| 2014/0281338 A1 | 9/2014 | Choi et al. | | |
| 2016/0062885 A1 | 3/2016 | Ryu | | |
| 2016/0124673 A1 | 5/2016 | Feng et al. | | |
| 2016/0266792 A1 | 9/2016 | Amaki et al. | | |
| 2017/0180478 A1 | 6/2017 | Hashimoto | | |
| 2018/0039574 A1 | 2/2018 | Feng et al. | | |

FOREIGN PATENT DOCUMENTS

| | | | |
|---|---|---|---|
| CN | 102609218 | A | 7/2012 |
| CN | 103257935 | A | 8/2013 |
| CN | 103336744 | A | 10/2013 |
| CN | 104023321 | A | 9/2014 |
| CN | 104090847 | A | 10/2014 |
| CN | 105302485 | A | 2/2016 |
| CN | 105630638 | A | 6/2016 |
| CN | 105740162 | A | 7/2016 |
| CN | 106681660 | A | 5/2017 |
| EP | 2160686 | B1 | 10/2012 |
| WO | 2009141789 | A1 | 11/2009 |

* cited by examiner

GARBAGE DATA SCRUBBING METHOD, AND DEVICE

CROSS-REFERENCE TO RELATED APPLICATIONS

This application is a National Stage of International Patent Application No. PCT/CN2017/106200 filed on Oct. 13, 2017, which claims priority to Chinese Patent Application No. 201710931551.3 filed on Oct. 9, 2017. Both of the aforementioned applications are hereby incorporated by reference in their entireties.

This application claims priority to Chinese Patent Application No. 201710931551.3, filed with the Chinese Patent Office on Oct. 9, 2017 and entitled "MOBILE TERMINAL GARBAGE SCRUBBING METHOD, AND DEVICE", which is incorporated herein by reference in its entirety.

TECHNICAL FIELD

Embodiments of this application relate to the field of terminals, and in particular, to a garbage data scrubbing method and a device.

BACKGROUND

In recent years, a nonvolatile storage device such as a flash memory is already widely applied to a terminal such as a mobile phone, and is used to store data. When an underlying storage device of a terminal is a flash memory, and when a user deletes a particular file of an application program installed in the terminal, a file system of the terminal does not really delete data of the deleted file from corresponding physical space in the flash memory, but marks only a logical address corresponding to the data of the deleted file as an invalid state such as "already deleted" or "idle". In such a deletion manner, the flash memory does not learn that the data of the deleted file is already invalid. That is, the data of the deleted file continues to occupy physical space and generates garbage data. After the flash memory is used for a long time, garbage data stored in the flash memory becomes more, and available physical space becomes less. When the available physical space in the flash memory is less than a particular threshold, the terminal triggers garbage collection (Garbage collection, GC), and the garbage collection affects foreground write performance of the terminal. In addition, when the garbage collection is performed, because a data transfer volume is great, garbage collection efficiency is reduced, and a life loss of the flash memory is increased. Consequently, performance of the flash memory is degraded.

To ensure that the foreground write performance of the terminal and the performance of the flash memory are not degraded, a discard (discard) message may be delivered to the flash memory, to instruct the flash memory to scrub corresponding garbage data. In the prior art, a user triggers a file system transaction, and delivers a discard message to a storage device such as a memory in a process of updating global data, so that the storage device scrubs garbage data. However, delivering the discard message in the file system transaction causes transaction blocking, affecting a user foreground operation.

SUMMARY

Embodiments of this application provide a garbage data scrubbing method and a device, to resolve a problem that delivering a discard message in a file system transaction affects a user foreground operation.

To achieve the foregoing objective, the following technical solutions are used in the embodiments of this application:

According to a first aspect in the embodiments of this application, a garbage data scrubbing method is provided, applied to a terminal, where the terminal includes a storage device, and the garbage data scrubbing method includes:

obtaining an input output (input output, IO) busy/idle status of the terminal at a current moment, where the IO busy/idle status includes a busy state and an idle state; and if the IO busy/idle status of the terminal at the current moment is the idle state, delivering a discard message to the storage device, where the discard message includes an initial address and a size of to-be-scrubbed physical space in the storage device, and the discard message is used to unbind a mapping relationship between a physical address of the to-be-scrubbed physical space and a corresponding logical address. When the IO busy/idle status of the terminal at the current moment is the idle state, delivery of the discard message may be implemented by setting a task (such as a kernel thread separately created or an operating queue separately created) in the background, or by using a specific interface.

In the garbage data scrubbing method provided in the embodiments of this application, when the IO busy/idle status of the terminal at the current moment is the idle state, the discard message is delivered to the storage device, so that garbage data is scrubbed in a timely manner without affecting a normal user foreground operation.

With reference to the first aspect, in a possible implementation, the obtaining an IO busy/idle status of the terminal at a current moment may specifically include: determining the IO busy/idle status based on whether there is an IO instruction of a scheduling queue of a block layer in a first time period. If there is not the IO instruction of the scheduling queue of the block layer in the first time period, the IO busy/idle status is the idle state; or if there is the IO instruction of the scheduling queue of the block layer in the first time period, the IO busy/idle status is the busy state, where an initial moment of the first time period is the current moment, and lasting duration of the first time period is a first time threshold.

With reference to the first aspect or the foregoing possible implementation, in another possible implementation, before the obtaining an IO busy/idle status of the terminal at a current moment, the garbage data scrubbing method may further include: obtaining a busy/idle status of a block layer, a busy/idle status of the storage device, a busy/idle status of an application layer, and a probability that the IO busy/idle status at the current moment is the busy state; and the obtaining an input output IO busy/idle status of the terminal at a current moment may specifically include: determining the IO busy/idle status based on the busy/idle status of the block layer, the busy/idle status of the storage device, the busy/idle status of the application layer, and the probability that the IO busy/idle status at the current moment is the busy state.

With reference to the first aspect or the foregoing possible implementations, in another possible implementation, if there is not the IO instruction of the scheduling queue of the block layer in the first time period, the busy/idle status of the block layer is the idle state; or if there is the IO instruction of the scheduling queue of the block layer in the first time period, the busy/idle status of the block layer is the busy state, where an initial moment of the first time period is the current moment, and lasting duration of the first time period is a first time threshold. If there is not an IO instruction of a scheduling queue of the storage device in a second time period, the busy/idle status of the storage device is the idle state; or if there is an IO instruction of a scheduling queue of the storage device in a second time period, the busy/idle status of the storage device is the busy state, where an initial moment of the second time period is the current moment, and lasting duration of the second time period is a second time threshold. If the application layer does not invoke, in a third time period, an interface of a file system that generates an IO instruction, the busy/idle status of the application layer is the idle state; or if the application layer invokes, in a third time period, an interface of a file system that generates an IO instruction, the busy/idle status of the application layer is the busy state, where an initial moment of the third time period is the current moment, and lasting duration of the third time period is a third time threshold. The probability that the IO busy/idle status at the current moment is the busy state is equal to a weighted sum of three degrees: a historical IO busy degree, an average IO busy degree, and a current-moment IO busy degree.

With reference to the first aspect or the foregoing possible implementations, in another possible implementation, if the busy/idle status of the block layer is the idle state, the busy/idle status of the storage device is the idle state, the busy/idle status of the application layer is the idle state, and the probability that the IO busy/idle status at the current moment is the busy state is greater than a first probability threshold, the IO busy/idle status is the idle state; or if at least one of the busy/idle status of the block layer, the busy/idle status of the storage device, and the busy/idle status of the application layer is the busy state, and/or the probability that the IO busy/idle status at the current moment is the busy state is less than a first probability threshold, the IO busy/idle status is the busy state.

With reference to the first aspect or the foregoing possible implementations, in another possible implementation, before the delivering a discard message to the storage device, the garbage data scrubbing method may further include: obtaining a policy set, where the policy set includes one or more of the following sub-policies: a quantity of discard messages sent at a single time, a granularity lower limit of the sent discard message, a sending interval between the discard messages sent twice, whether sending the discard message again needs to wait for the storage device to complete processing the discard message sent previously, and a priority of sending the discard message; and the delivering a discard message to the storage device may specifically include: delivering the discard message to the storage device based on the policy set. In this way, by delivering the discard message in parallel, a capability of the storage device to process the discard message is used to a larger extent, to improve a garbage data scrubbing speed. Rapid recovery of storage device performance is implemented by dynamically adjusting a rate and a granularity of delivering the discard message.

With reference to the first aspect or the foregoing possible implementations, in another possible implementation, before the obtaining a policy set, the garbage data scrubbing method may further include: obtaining a space status of a file system and a space status of the storage device, where the space status includes an idle state and a non-idle state; and the obtaining a policy set may specifically include: obtaining the policy set based on the space status of the file system and the space status of the storage device. In this way, dynamic adjustment on the rate and the granularity of delivering the discard message is implemented by perceiving the space status of the file system and the space status of the storage device.

With reference to the first aspect or the foregoing possible implementations, in another possible implementation, if a ratio of remaining continuous available physical space of the file system to remaining available physical space of the file system is greater than a first idle threshold, the space status of the file system is the idle state; or if a ratio of remaining continuous available physical space of the file system to remaining available physical space of the file system is less than a first idle threshold, the space status of the file system is the non-idle state. If a ratio of actually available physical space of the storage device to all physical space of the storage device is greater than a second idle threshold, the space status of the storage device is the idle state; or if a ratio of actually available physical space of the storage device to all physical space of the storage device is less than a second idle threshold, the space status of the storage device is the non-idle state, and the actually available physical space of the storage device is equal to remaining physical space obtained after physical space that needs to be discarded is subtracted from the remaining available physical space of the file system.

With reference to the first aspect or the foregoing possible implementations, in another possible implementation, if the space status of the file system is the idle state, and the space status of the storage device is the idle state, the quantity of discard messages sent at the single time is X, the granularity lower limit of the sent discard message is a first granularity, the sending interval between the discard messages sent twice is first duration, sending the discard message again needs to wait for the storage device to complete processing the discard message sent previously, and the priority of sending the discard message is a first priority. If the space status of the file system is the non-idle state, and the space status of the storage device is the idle state, or if the space status of the file system is the idle state, and the space status of the storage device is the non-idle state, the quantity of discard messages sent at the single time is Y the granularity lower limit of the sent discard message is a second granularity, the sending interval between the discard messages sent twice is second duration, sending the discard message again needs to wait for the storage device to complete processing the discard message sent previously, and the priority of sending the discard message is a second priority. If the space status of the file system is the non-idle state, and the space status of the storage device is the non-idle state, the quantity of discard messages sent at the single time is Z, the granularity lower limit of the sent discard message is a third granularity, the sending interval between the discard messages sent twice is third duration, sending the discard message again does not need to wait for the storage device to complete processing the discard message sent previously, and the priority of sending the discard message is a third priority, where X<Y<Z, the first granularity is greater than the second granularity, and the second granularity greater than the third granularity; the first duration is greater than the second duration, and the second duration is greater than the third duration; and the first priority is less than the second priority, and the second priority is less than the third priority.

With reference to the first aspect or the foregoing possible implementations, in another possible implementation, the garbage data scrubbing method may further include: obtaining a life loss of the storage device in each of available granularities, where the available granularity is greater than or equal to the granularity lower limit; and determining a priority of each granularity based on the life loss of the storage device in each granularity; and the delivering the discard message to the storage device based on the policy set may specially include: sending the discard message based on the policy set and the priority of each granularity. In this way, the discard message is delivered based on priorities of various granularities, to reduce a life loss speed of the storage device.

With reference to the first aspect or the foregoing possible implementations, in another possible implementation, before the delivering a discard message to the storage device, the garbage data scrubbing method may further include: obtaining a life loss of the storage device in each of available granularities, where the available granularity is a preset granularity; and determining a priority of each granularity based on the life loss of the storage device in each granularity; and the delivering a discard message to the storage device may specifically include: sending the discard message based on the priority of each granularity. In this way, the discard message is delivered based on priorities of various granularities, to reduce a life loss speed of the storage device.

With reference to the first aspect or the foregoing possible implementations, in another possible implementation, a smaller ratio of the life loss of the storage device in the granularity to the granularity indicates a higher priority of the granularity; or a larger difference between a life loss threshold and the life loss of the storage device in the granularity indicates a higher priority of the granularity.

According to a second aspect in the embodiments of this application, a terminal is provided, including: an obtaining unit, configured to obtain an input output IO busy/idle status of the terminal at a current moment, where the IO busy/idle status includes a busy state and an idle state; and a sending unit, configured to: if the IO busy/idle status that is of the terminal at the current moment and that is obtained by the obtaining unit is the idle state, deliver a discard message to a storage device of the terminal, where the discard message includes an initial address and a size of to-be-scrubbed physical space in the storage device, and the discard message is used to unbind a mapping relationship between a physical address of the to-be-scrubbed physical space and a corresponding logical address.

With reference to the second aspect, in a possible implementation, the obtaining unit is specifically configured to determine the IO busy/idle status based on whether there is an IO instruction of a scheduling queue of a block layer in a first time period. If there is not the IO instruction of the scheduling queue of the block layer in the first time period, the IO busy/idle status is the idle state; or if there is the IO instruction of the scheduling queue of the block layer in the first time period, the IO busy/idle status is the busy state, where an initial moment of the first time period is the current moment, and lasting duration of the first time period is a first time threshold.

With reference to the second aspect or the foregoing possible implementation, in another possible implementation, the obtaining unit is further configured to obtain a busy/idle status of a block layer, a busy/idle status of the storage device, a busy/idle status of an application layer, and a probability that the IO busy/idle status at the current moment is the busy state; and the obtaining unit is specifically configured to determine the IO busy/idle status based on the busy/idle status of the block layer, the busy/idle status of the storage device, the busy/idle status of the application layer, and the probability that the IO busy/idle status at the current moment is the busy state.

With reference to the second aspect or the foregoing possible implementations, in another possible implementation, if there is not the IO instruction of the scheduling queue of the block layer in the first time period, the busy/idle status of the block layer is the idle state; or if there is the IO instruction of the scheduling queue of the block layer in the first time period, the busy/idle status of the block layer is the busy state, where an initial moment of the first time period is the current moment, and lasting duration of the first time period is a first time threshold. If there is not an IO instruction of a scheduling queue of the storage device in a second time period, the busy/idle status of the storage device is the idle state; or if there is an IO instruction of a scheduling queue of the storage device in a second time period, the busy/idle status of the storage device is the busy state, where an initial moment of the second time period is the current moment, and lasting duration of the second time period is a second time threshold. If the application layer does not invoke, in a third time period, an interface of a file system that generates an IO instruction, the busy/idle status of the application layer is the idle state; or if the application layer invokes, in a third time period, an interface of a file system that generates an IO instruction, the busy/idle status of the application layer is the busy state, where an initial moment of the third time period is the current moment, and lasting duration of the third time period is a third time threshold. The probability that the IO busy/idle status at the current moment is the busy state is equal to a weighted sum of three degrees: a historical IO busy degree, an average IO busy degree, and a current-moment IO busy degree.

With reference to the second aspect or the foregoing possible implementations, in another possible implementation, if the busy/idle status of the block layer is the idle state, the busy/idle status of the storage device is the idle state, the busy/idle status of the application layer is the idle state, and the probability that the IO busy/idle status at the current moment is the busy state is greater than a first probability threshold, the IO busy/idle status is the idle state; or if at least one of the busy/idle status of the block layer, the busy/idle status of the storage device, and the busy/idle status of the application layer is the busy state, and/or the probability that the IO busy/idle status at the current moment is the busy state is less than a first probability threshold, the IO busy/idle status is the busy state.

With reference to the second aspect or the foregoing possible implementations, in another possible implementation, the obtaining unit is further configured to obtain a policy set, where the policy set includes one or more of the following sub-policies: a quantity of discard messages sent at a single time, a granularity lower limit of the sent discard message, a sending interval between the discard messages sent twice, whether sending the discard message again needs to wait for the storage device to complete processing the discard message sent previously, and a priority of sending the discard message; and the sending unit is specifically configured to deliver the discard message to the storage device based on the policy set obtained by the obtaining unit.

With reference to the second aspect or the foregoing possible implementations, in another possible implementation, the obtaining unit is further configured to obtain a space status of a file system and a space status of the storage device, where the space status includes an idle state and a non-idle state; and the obtaining unit is specifically configured to obtain the policy set based on the space status of the file system and the space status of the storage device.

With reference to the second aspect or the foregoing possible implementations, in another possible implementation, if a ratio of remaining continuous available physical space of the file system to remaining available physical space of the file system is greater than a first idle threshold, the space status of the file system is the idle state; or if a ratio of remaining continuous available physical space of the file system to remaining available physical space of the file system is less than a first idle threshold, the space status of the file system is the non-idle state. If a ratio of actually available physical space of the storage device to all physical space of the storage device is greater than a second idle threshold, the space status of the storage device is the idle state; or if a ratio of actually available physical space of the storage device to all physical space of the storage device is less than a second idle threshold, the space status of the storage device is the non-idle state, and the actually available physical space of the storage device is equal to remaining physical space obtained after physical space that needs to be discarded is subtracted from the remaining available physical space of the file system.

With reference to the second aspect or the foregoing possible implementations, in another possible implementation, if the space status of the file system is the idle state, and the space status of the storage device is the idle state, the quantity of discard messages sent at the single time is X, the granularity lower limit of the sent discard message is a first granularity, the sending interval between the discard messages sent twice is first duration, sending the discard message again needs to wait for the storage device to complete processing the discard message sent previously, and the priority of sending the discard message is a first priority. If the space status of the file system is the non-idle state, and the space status of the storage device is the idle state, or if the space status of the file system is the idle state, and the space status of the storage device is the non-idle state, the quantity of discard messages sent at the single time is Y, the granularity lower limit of the sent discard message is a second granularity, the sending interval between the discard messages sent twice is second duration, sending the discard message again needs to wait for the storage device to complete processing the discard message sent previously, and the priority of sending the discard message is a second priority. If the space status of the file system is the non-idle state, and the space status of the storage device is the non-idle state, the quantity of discard messages sent at the single time is Z, the granularity lower limit of the sent discard message is a third granularity, the sending interval between the discard messages sent twice is third duration, sending the discard message again does not need to wait for the storage device to complete processing the discard message sent previously, and the priority of sending the discard message is a third priority, where X<Y<Z, the first granularity is greater than the second granularity, and the second granularity greater than the third granularity; the first duration is greater than the second duration, and the second duration is greater than the third duration; and the first priority is less than the second priority, and the second priority is less than the third priority.

With reference to the second aspect or the foregoing possible implementations, in another possible implementation, the obtaining unit is further configured to: obtain a life loss of the storage device in each of available granularities, where the available granularity is greater than or equal to the granularity lower limit, and determine a priority of each granularity based on the life loss of the storage device in each granularity; and the sending unit is specifically configured to send the discard message based on the policy set and the priority of each granularity.

With reference to the second aspect or the foregoing possible implementations, in another possible implementation, the obtaining unit is further configured to: obtain a life loss of the storage device in each of available granularities, where the available granularity is a preset granularity, and determine a priority of each granularity based on the life loss of the storage device in each granularity; and the sending unit is specifically configured to send the discard message based on the priority that is of each granularity and that is obtained by the obtaining unit.

With reference to the second aspect or the foregoing possible implementations, in another possible implementation, a smaller ratio of the life loss of the storage device in the granularity to the granularity indicates a higher priority of the granularity; or a larger difference between a life loss threshold and the life loss of the storage device in the granularity indicates a higher priority of the granularity.

According to a third aspect in the embodiments of this application, a terminal is provided, including: one or more processors, and a memory, where the memory is configured to store computer program code, the computer program code includes a computer instruction, and when the one or more processors execute the computer instruction, the terminal performs the garbage data scrubbing method according to any one of the first aspect or the possible implementations of the first aspect. The memory may be the foregoing storage device.

Specifically, the processor is configured to: obtain an IO busy/idle status of the terminal at a current moment, where the IO busy/idle status includes a busy state and an idle state; and if the IO busy/idle status of the terminal at the current moment is the idle state, deliver a discard message to the storage device, where the discard message includes an initial address and a size of to-be-scrubbed physical space in the storage device, and the discard message is used to unbind a mapping relationship between a physical address of the to-be-scrubbed physical space and a corresponding logical address.

With reference to the third aspect, in a possible implementation, the processor is specifically configured to determine the IO busy/idle status based on whether there is an IO instruction of a scheduling queue of a block layer in a first time period. If there is not the IO instruction of the scheduling queue of the block layer in the first time period, the IO busy/idle status is the idle state; or if there is the IO instruction of the scheduling queue of the block layer in the first time period, the IO busy/idle status is the busy state, where an initial moment of the first time period is the current moment, and lasting duration of the first time period is a first time threshold.

With reference to the third aspect or the foregoing possible implementation, in another possible implementation, the processor is further configured to obtain a busy/idle status of a block layer, a busy/idle status of the storage device, a busy/idle status of an application layer, and a probability that the IO busy/idle status at the current moment is the busy state; and the processor is specifically configured to determine the IO busy/idle status based on the busy/idle status of the block layer, the busy/idle status of the storage device, the busy/idle status of the application layer, and the probability that the IO busy/idle status at the current moment is the busy state.

With reference to the third aspect or the foregoing possible implementations, in another possible implementation, if there is not the IO instruction of the scheduling queue of the block layer in the first time period, the busy/idle status of the block layer is the idle state; or if there is the IO instruction of the scheduling queue of the block layer in the first time period, the busy/idle status of the block layer is the busy state, where an initial moment of the first time period is the current moment, and lasting duration of the first time period is a first time threshold. If there is not an IO instruction of a scheduling queue of the storage device in a second time period, the busy/idle status of the storage device is the idle state; or if there is an IO instruction of a scheduling queue of the storage device in a second time period, the busy/idle status of the storage device is the busy state, where an initial moment of the second time period is the current moment, and lasting duration of the second time period is a second time threshold. If the application layer does not invoke, in a third time period, an interface of a file system that generates an IO instruction, the busy/idle status of the application layer is the idle state; or if the application layer invokes, in a third time period, an interface of a file system that generates an IO instruction, the busy/idle status of the application layer is the busy state, where an initial moment of the third time period is the current moment, and lasting duration of the third time period is a third time threshold. The probability that the IO busy/idle status at the current moment is the busy state is equal to a weighted sum of three degrees: a historical IO busy degree, an average IO busy degree, and a current-moment IO busy degree.

With reference to the third aspect or the foregoing possible implementations, in another possible implementation, if the busy/idle status of the block layer is the idle state, the busy/idle status of the storage device is the idle state, the busy/idle status of the application layer is the idle state, and the probability that the IO busy/idle status at the current moment is the busy state is greater than a first probability threshold, the IO busy/idle status is the idle state; or if at least one of the busy/idle status of the block layer, the busy/idle status of the storage device, and the busy/idle status of the application layer is the busy state, and/or the probability that the IO busy/idle status at the current moment is the busy state is less than a first probability threshold, the IO busy/idle status is the busy state.

With reference to the third aspect or the foregoing possible implementations, in another possible implementation, the processor is further configured to obtain a policy set, where the policy set includes one or more of the following sub-policies: a quantity of discard messages sent at a single time, a granularity lower limit of the sent discard message, a sending interval between the discard messages sent twice, whether sending the discard message again needs to wait for the storage device to complete processing the discard message sent previously, and a priority of sending the discard message; and the processor is specifically configured to deliver the discard message to the storage device based on the policy set.

With reference to the third aspect or the foregoing possible implementations, in another possible implementation, the processor is further configured to obtain a space status of a file system and a space status of the storage device, where the space status includes an idle state and a non-idle state; and the processor is specifically configured to obtain the policy set based on the space status of the file system and the space status of the storage device.

With reference to the third aspect or the foregoing possible implementations, in another possible implementation, if a ratio of remaining continuous available physical space of the file system to remaining available physical space of the file system is greater than a first idle threshold, the space status of the file system is the idle state; or if a ratio of remaining continuous available physical space of the file system to remaining available physical space of the file system is less than a first idle threshold, the space status of the file system is the non-idle state. If a ratio of actually available physical space of the storage device to all physical space of the storage device is greater than a second idle threshold, the space status of the storage device is the idle state; or if a ratio of actually available physical space of the storage device to all physical space of the storage device is less than a second idle threshold, the space status of the storage device is the non-idle state, and the actually available physical space of the storage device is equal to remaining physical space obtained after physical space that needs to be discarded is subtracted from the remaining available physical space of the file system.

With reference to the third aspect or the foregoing possible implementations, in another possible implementation, if the space status of the file system is the idle state, and the space status of the storage device is the idle state, the quantity of discard messages sent at the single time is X, the granularity lower limit of the sent discard message is a first granularity, the sending interval between the discard messages sent twice is first duration, sending the discard message again needs to wait for the storage device to complete processing the discard message sent previously, and the priority of sending the discard message is a first priority. If the space status of the file system is the non-idle state, and the space status of the storage device is the idle state, or if the space status of the file system is the idle state, and the space status of the storage device is the non-idle state, the quantity of discard messages sent at the single time is Y, the granularity lower limit of the sent discard message is a second granularity, the sending interval between the discard messages sent twice is second duration, sending the discard message again needs to wait for the storage device to complete processing the discard message sent previously, and the priority of sending the discard message is a second priority. If the space status of the file system is the non-idle state, and the space status of the storage device is the non-idle state, the quantity of discard messages sent at the single time is Z, the granularity lower limit of the sent discard message is a third granularity, the sending interval between the discard messages sent twice is third duration, sending the discard message again does not need to wait for the storage device to complete processing the discard message sent previously, and the priority of sending the discard message is a third priority, where $X<Y<Z$, the first granularity is greater than the second granularity, and the second granularity greater than the third granularity; the first duration is greater than the second duration, and the second duration is greater than the third duration; and the first priority is less than the second priority, and the second priority is less than the third priority.

With reference to the third aspect or the foregoing possible implementations, in another possible implementation, the processor is further configured to: obtain a life loss of the storage device in each of available granularities, where the available granularity is greater than or equal to the granularity lower limit, and determine a priority of each granularity based on the life loss of the storage device in each granularity; and the processor is specifically configured to send the discard message based on the policy set and the priority of each granularity.

With reference to the third aspect or the foregoing possible implementations, in another possible implementation, the processor is further configured to: obtain a life loss of the storage device in each of available granularities, where the available granularity is a preset granularity, and determine a priority of each granularity based on the life loss of the storage device in each granularity; and the processor is specifically configured to send the discard message based on the priority of each granularity.

With reference to the third aspect or the foregoing possible implementations, in another possible implementation, a smaller ratio of the life loss of the storage device in the granularity to the granularity indicates a higher priority of the granularity; or a larger difference between a life loss threshold and the life loss of the storage device in the granularity indicates a higher priority of the granularity.

According to a fourth aspect in the embodiments of this application, a garbage data scrubbing method is provided, applied to a terminal, where the terminal includes a storage device, and the garbage data scrubbing method may include:

obtaining a space status of a file system and a space status of the storage device, where the space status includes an idle state and a non-idle state; obtaining a policy set based on the space status of the file system and the space status of the storage device, where the policy set includes one or more of the following sub-policies: a quantity of discard messages sent at a single time, a granularity lower limit of a sent discard message, a sending interval between discard messages sent twice, whether sending a discard message again needs to wait for the storage device to complete processing a discard message sent previously, and a priority of sending a discard message; and delivering the discard message to the storage device based on the policy set, where the discard message includes an initial address and a size of to-be-scrubbed physical space in the storage device, and the discard message is used to unbind a mapping relationship between a physical address of the to-be-scrubbed physical space and a corresponding logical address.

In the garbage data scrubbing method provided in the embodiments of this application, the policy set is obtained based on the obtained space status of the file system and the obtained space status of the storage device, so that the discard message is delivered to the storage device based on the policy set. In this way, dynamic adjustment on a rate and a granularity of delivering the discard message is implemented and rapid recovery of storage device performance is implemented by perceiving the space status of the file system and the space status of the storage device. In addition, by delivering the discard message in parallel, a capability of the storage device to process the discard message is used to a larger extent, to improve a garbage data scrubbing speed.

With reference to the fourth aspect, in a possible implementation, before the delivering the discard message to the storage device based on the policy set, the garbage data scrubbing method may further include: obtaining an IO busy/idle status of the terminal at a current moment, where the IO busy/idle status includes a busy state and an idle state; and the delivering the discard message to the storage device based on the policy set may specifically include: if the IO busy/idle status of the terminal at the current moment is the idle state, delivering the discard message to the storage device based on the policy set. In this way, when the IO busy/idle status of the terminal at the current moment is the idle state, the discard message is delivered to the storage device, so that garbage data is scrubbed in a timely manner without affecting a normal user foreground operation.

With reference to the fourth aspect or the foregoing possible implementation, in another possible implementation, the obtaining an input output IO busy/idle status of the terminal at a current moment includes: determining the IO busy/idle status based on whether there is an IO instruction of a scheduling queue of a block layer in a first time period. If there is not the IO instruction of the scheduling queue of the block layer in the first time period, the IO busy/idle status is the idle state; or if there is the IO instruction of the scheduling queue of the block layer in the first time period, the IO busy/idle status is the busy state, where an initial moment of the first time period is the current moment, and lasting duration of the first time period is a first time threshold.

With reference to the fourth aspect or the foregoing possible implementation, in another possible implementation, before the obtaining an IO busy/idle status of the terminal at a current moment, the garbage data scrubbing method may further include: obtaining a busy/idle status of a block layer, a busy/idle status of the storage device, a busy/idle status of an application layer, and a probability that the IO busy/idle status at the current moment is the busy state; and the obtaining an IO busy/idle status of the terminal at a current moment may specifically include: determining the IO busy/idle status based on the busy/idle status of the block layer, the busy/idle status of the storage device, the busy/idle status of the application layer, and the probability that the IO busy/idle status at the current moment is the busy state.

With reference to the fourth aspect or the foregoing possible implementations, in another possible implementation, the garbage data scrubbing method may further include: obtaining a life loss of the storage device in each of available granularities, where the available granularity is greater than or equal to the granularity lower limit; and determining a priority of each granularity based on the life loss of the storage device in each granularity; and the delivering the discard message to the storage device based on the policy set may specially include: sending the discard message based on the policy set and the priority of each granularity.

With reference to the fourth aspect or the foregoing possible implementations, in another possible implementation, a smaller ratio of the life loss of the storage device in the granularity to the granularity indicates a higher priority of the granularity; or a larger difference between a life loss threshold and the life loss of the storage device in the granularity indicates a higher priority of the granularity.

According to a fifth aspect in the embodiments of this application, a garbage data scrubbing method is provided, applied to a terminal, where the terminal includes a storage device, and the garbage data scrubbing method may include:

obtaining a life loss of the storage device in each of available granularities; determining a priority of each granularity based on the life loss of the storage device in each granularity; and delivering a discard message to the storage device based on the priority of each granularity, where the discard message includes an initial address and a size of to-be-scrubbed physical space in the storage device, and the discard message is used to unbind a mapping relationship between a physical address of the to-be-scrubbed physical space and a corresponding logical address.

In the garbage data scrubbing method provided in the embodiments of this application, the life loss of the storage device in each of the available granularities is obtained, and the priority of each granularity is determined based on the life loss of the storage device in each granularity, so that the discard message is delivered to the storage device based on the priority of each granularity. In this way, the discard message is delivered based on priorities of various granularities, to reduce a life loss speed of the storage device.

With reference to the fifth aspect, in a possible implementation, before the delivering a discard message to the storage device based on the priority of each granularity, the garbage data scrubbing method may further include: obtaining a policy set, where the policy set includes one or more of the following sub-policies: a quantity of discard messages sent at a single time, a granularity lower limit of the sent discard message, a sending interval between the discard messages sent twice, whether sending the discard message again needs to wait for the storage device to complete processing the discard message sent previously, and a priority of sending the discard message, and the available granularity is greater than or equal to the granularity lower limit; and the delivering a discard message to the storage device based on the priority of each granularity may specifically include: delivering the discard message to the storage device based on the policy set and the priority of each granularity.

With reference to the fifth aspect or the foregoing possible implementation, in another possible implementation, before the obtaining a policy set, the garbage data scrubbing method may further include: obtaining a space status of a file system and a space status of the storage device, where the space status includes an idle state and a non-idle state; and the obtaining a policy set may specifically include: obtaining the policy set based on the space status of the file system and the space status of the storage device.

With reference to the fifth aspect or the foregoing possible implementations, in another possible implementation, before the delivering a discard message to the storage device based on the priority of each granularity, the garbage data scrubbing method may further include: obtaining an IO busy/idle status of the terminal at a current moment, where the IO busy/idle status includes a busy state and an idle state; and the delivering a discard message to the storage device based on the priority of each granularity may specifically include: if the IO busy/idle status of the terminal at the current moment is the idle state, delivering the discard message to the storage device based on the priority of each granularity.

With reference to the fifth aspect or the possible implementations, in another possible implementation, the obtaining an IO busy/idle status of the terminal at a current moment may specifically include: determining the IO busy/idle status based on whether there is an IO instruction of a scheduling queue of a block layer in a first time period.

With reference to the fifth aspect or the foregoing possible implementation, in another possible implementation, before the obtaining an IO busy/idle status of the terminal at a current moment, the garbage data scrubbing method may further include: obtaining a busy/idle status of a block layer, a busy/idle status of the storage device, a busy/idle status of an application layer, and a probability that the IO busy/idle status at the current moment is the busy state; and the obtaining an IO busy/idle status of the terminal at a current moment may specifically include: determining the IO busy/idle status based on the busy/idle status of the block layer, the busy/idle status of the storage device, the busy/idle status of the application layer, and the probability that the IO busy/idle status at the current moment is the busy state.

With reference to the fifth aspect or the foregoing possible implementations, in another possible implementation, a smaller ratio of the life loss of the storage device in the granularity to the granularity indicates a higher priority of the granularity; or a larger difference between a life loss threshold and the life loss of the storage device in the granularity indicates a higher priority of the granularity.

It should be noted that detailed descriptions of the garbage data scrubbing method according to the fourth aspect and the fifth aspect are similar to detailed descriptions of the garbage data scrubbing method according to the first aspect. For the detailed descriptions of the garbage data scrubbing method according to the fourth aspect and the fifth aspect, refer to the descriptions of corresponding content in the first aspect. Details are not described in the embodiments of this application again.

According to a sixth aspect in the embodiments of this application, a terminal is provided, including: one or more processors, and a memory, where the memory is configured to store computer program code, the computer program code includes a computer instruction, and when the one or more processors execute the computer instruction, the terminal performs the garbage data scrubbing method according to any one of the fourth aspect or the possible implementations of the fourth aspect, or the fifth aspect or the possible implementations of the fifth aspect. The memory may be the foregoing storage device.

According to a seventh aspect in the embodiments of this application, a computer storage medium is provided, including a computer instruction, and when the computer instruction is run on a terminal, the terminal is enabled to perform the garbage data scrubbing method according to any one of the first aspect or the possible implementations of the first aspect, or the fourth aspect or the possible implementations of the fourth aspect, or the fifth aspect or the possible implementations of the fifth aspect.

According to an eighth aspect in the embodiments of this application, a computer program product is provided, and when the computer program product is run on a computer, the computer is enabled to perform the garbage data scrubbing method according to any one of the first aspect or the possible implementations of the first aspect, or the fourth aspect or the possible implementations of the fourth aspect, or the fifth aspect or the possible implementations of the fifth aspect.

It may be understood that the terminal provided according to the second aspect, the third aspect and the sixth aspect, the computer storage medium according to the seventh aspect, and the computer program product according to the eighth aspect are all configured to perform the corresponding method provided above. Therefore, for beneficial effects achieved by the terminal, the computer storage medium, and the computer program product, refer to beneficial effects of the corresponding method provided above. Details are not described herein again.

DESCRIPTION OF EMBODIMENTS

Figure 1:
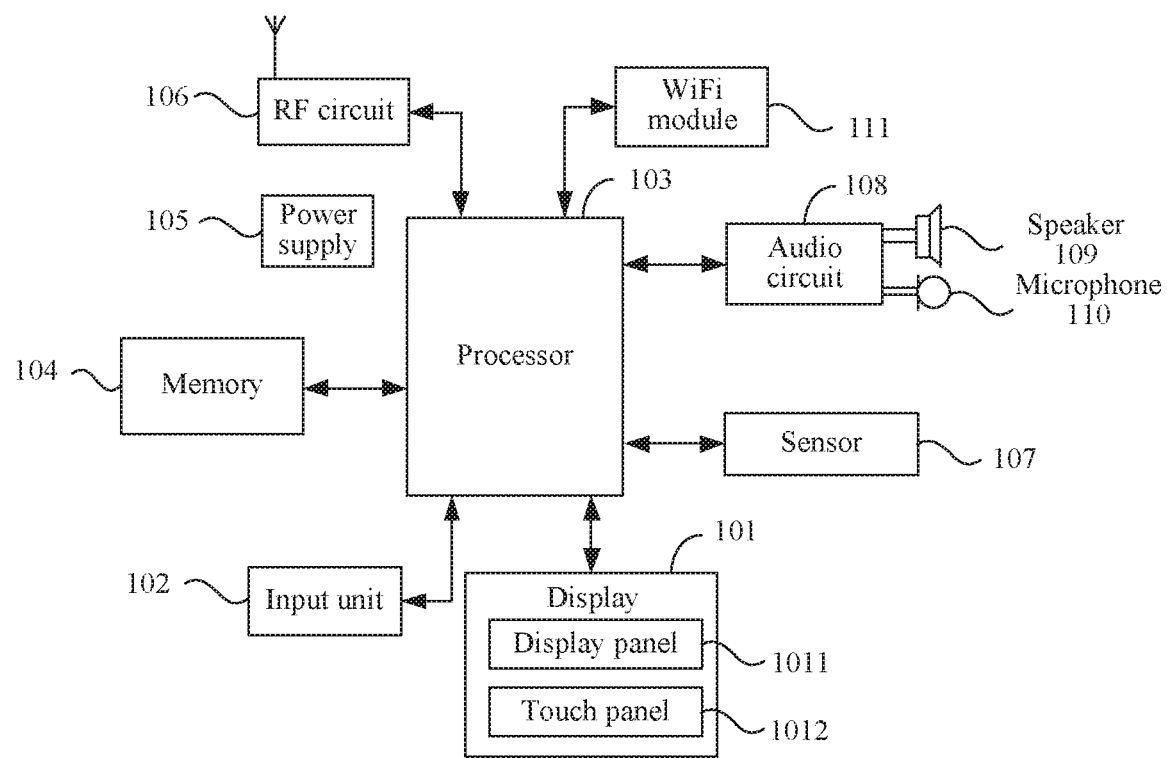
FIG. 1 is a schematic diagram of composition of a mobile phone according to an embodiment of this application.

A nonvolatile storage device such as a flash memory is already widely applied to a terminal, and is used to store data. Because the flash memory has a feature of erasing before writing, and usually uses an out-of-place update policy when updating data, the flash memory generates a large amount of garbage data after a time period of use, and distribution of available physical space is in a discrete state. Garbage data is data that is already marked as an invalid state on a file system side stored in the flash memory but is still valid on a flash memory side.

Currently, a selected target block may be erased for reuse by performing a garbage collection operation on the garbage data, to further ensure normal use of the flash memory. Because a read/write granularity of the flash memory is different from an erasure granularity of the flash memory, before a block is erased, valid data in the block needs to be transferred. A transfer process may be usually referred to as device garbage sweeping, that is, garbage collection. However, the garbage collection affects foreground write performance of the terminal and degrades performance of the flash memory.

To ensure that the foreground write performance of the terminal and the performance of the flash memory are not degraded, a discard message may be usually delivered to the flash memory, to instruct the flash memory to scrub corresponding garbage data. In embodiments of this application, the discard message may be a discard message. The discard message is a special command supported by the flash memory. When a file system or an application program no longer uses data of particular physical space in the flash memory, a mapping relationship between a physical address of corresponding physical space in the flash memory and a corresponding logical address may be unbound by delivering, to the flash memory, the discard message carrying an initial address and a size of the corresponding physical space, to scrub the garbage data in the corresponding physical space.

However, in the prior art, delivery of the discard message is bound to a file system transaction. Delivering the discard message in the file system transaction causes transaction blocking, affecting a user foreground operation. To ensure that the user foreground operation is not affected in a garbage data scrubbing process, the embodiments of this application provides a garbage data scrubbing method. When an IO busy/idle status of the terminal is an idle state, the discard message is delivered to the storage device, so that the garbage data is scrubbed without affecting a normal user foreground operation.

The following describes the implementations of the embodiments of this application in detail with reference to accompanying drawings.

It should be noted that the garbage data scrubbing method provided in the embodiments of this application may be applied to a terminal including a storage device. The storage device may be a device using a shingled magnetic recording (Shingled Magnetic Recording. SMR) technology, or may be a flash memory, such as a secure digital (Secure Digital, SD) card, an embedded multimedia card (Embedded MultiMedia Card, eMMC), or universal flash storage (Universal Flash Storage, UFS). For example, the terminal may be a device, such as a mobile phone, a tablet computer, a desktop computer, a laptop computer, a notebook computer, an ultra-mobile personal computer (Ultra-mobile Personal Computer, UMPC), a hand-held computer, a netbook, a personal digital assistant (Personal Digital Assistant, PDA), a wearable electronic device, or a smartwatch, or may be a storage device, such as a server. A specific form of the terminal is not particularly limited in the embodiments of this application.

The embodiments of this application describe, by using an example in which the terminal is a mobile phone, the garbage data scrubbing method provided in this application. The following specifically describes various components of the mobile phone with reference to the accompanying drawings.

As shown in FIG. 1, the mobile phone may include components such as a display 101, an input unit 102, a processor 103, a memory 104, a power supply 105, a radio frequency (Radio Frequency, RF) circuit 106, a sensor 107, an audio circuit 108, a speaker 109, a microphone 110, and a wireless fidelity (Wireless Fidelity, WiFi) module 111. The components may be connected to each other through a bus, or may be directly connected to each other. A person skilled in the art may understand that, the structure of the mobile phone shown in FIG. 1 does not constitute any limitation on the mobile phone, and the mobile phone may include more components than those shown in the figure, or combine some components, or have different component deployments.

The display 101 may be configured to display information input by a user or information provided for a user, and various menus of the mobile phone, or may further receive an input operation of the user. Specifically, the display 101 may include a display panel 1011 and a touch panel 1012.

The display panel 1011 may be configured in a form of a liquid crystal display (Liquid Crystal Display, LCD), an organic light-emitting diode (Organic Light-Emitting Diode, OLED), or the like.

The touch panel 1012 may also be referred to as a touchscreen, a touch-sensitive screen, a touchscreen, or the like, and may collect a contact or non-contact operation of the user on or near the touch panel 1012 (for example, an operation of the user on or near the touch panel 1012 by using any proper object or accessory such as a finger or a stylus, or a motion sensing operation may be included, where the operation includes a single-point control operation, a multi-point control operation, and another type of operation), and drive a corresponding connection apparatus based on a preset program. Optionally, the touch panel 1012 may include two parts: a touch detection apparatus and a touch controller. The touch detection apparatus detects a touch position and a gesture of the user, detects a signal generated by a touch operation, and transfers the signal to the touch controller. The touch controller receives the touch signal from the touch detection apparatus, converts the received touch signal into information that can be processed by the processor 103 and sends the information to the processor 103, and can receive a command sent by the processor 103 and execute the command. In addition, the touch panel 1012 may be implemented by using a plurality of types such as a resistive type, a capacitive type, an infrared type, and a surface sound wave type, or the touch panel 1012 may be implemented by using any technology developed in the future. This is not limited in an embodiment of this application.

Further, the touch panel 1012 may cover the display panel 1011. The user may perform, based on content (the displayed content includes any one of or a combination of the following: a soft keyboard, a virtual mouse, a virtual button, an icon, or the like) displayed on the display panel 1011, an operation on or near the touch panel 1012 covered by the display panel 1011. After detecting the operation on or near the touch panel 1012, the touch panel 1012 transfers the operation to the processor 103 through an input/output subsystem, to determine user input. Subsequently, the processor 103 provides corresponding visual output on the display panel 1011 based on the user input through the input/output subsystem. In FIG. 1, the touch panel 1012 and the display panel 1011 serve as two separate components to implement input and input functions of the mobile phone. However, in some embodiments, the touch panel 1012 and the display panel 1011 may be integrated to implement the input and the output functions of the mobile phone.

The input unit 102 may be the foregoing touch panel 1012, or may be another input device. The another input device may be configured to receive input digital or character information, and generate key signal input related to a user setting and function control of the mobile phone. Specifically, the another input device may include any one of or a combination of the following: a physical keyboard, a function key (such as a volume control key or a power on/off key), a trackball, a mouse, a joystick, an optical mouse (the optical mouse is a touch-sensitive surface that does not display visual output, or an extension of a touch-sensitive surface formed by a touchscreen), and the like. The another input device is connected to another input device controller of the input/output subsystem, and performs signal exchange with the processor 103 under control of the another input device controller.

The processor 103 is a control center of the mobile phone, is connected to various components of the entire mobile phone by using various interfaces and lines, and performs various functions and data processing of the mobile phone by running or executing a software program and/or a module that are/is stored in the memory 104 and invoking data stored in the memory 104, to perform overall monitoring on the mobile phone. Optionally, the processor 103 may include one or more processing units. The processor 103 may integrate an application processor and a modem processor. The application processor mainly processes an operating system, a user interface, an application program, and the like. The modem processor mainly processes wireless communication. It may be understood that the foregoing modem processor may alternatively be not integrated into the processor 103.

The memory 104 may be the foregoing storage device. The memory 104 may be configured to store an operating system file, an executable file, and other user data. The processor 103 performs various function applications and data processing of the mobile phone, for example, performs the garbage data scrubbing method provided in the embodiments of this application, by running the operating system file and the executable file that are stored in the memory 104.

Specifically, in this embodiment of this application, the processor 103 may perform the following operations by running the operating system file and the executable file that are stored in the memory 104.

The processor 103 is configured to: obtain an IO busy/idle status of the mobile phone at a current moment, where the IO busy/idle status includes a busy state and an idle state; and if the IO busy/idle status of the mobile phone at the current moment is the idle state, deliver a discard message to the storage device. The discard message includes an initial address and a size of to-be-scrubbed physical space in the storage device, and is used to unbind a mapping relationship between a physical address of the to-be-scrubbed physical space and a corresponding logical address.

Further, the processor 103 is specifically configured to determine the IO busy/idle status based on whether there is an IO instruction of a scheduling queue of a block layer in a first time period. If there is not the IO instruction of the scheduling queue of the block layer in the first time period, the IO busy/idle status is the idle state; or if there is the IO instruction of the scheduling queue of the block layer in the first time period, the IO busy/idle status is the busy state, where an initial moment of the first time period is the current moment, and lasting duration of the first time period is a first time threshold.

Further, the processor 103 is further configured to obtain a busy/idle status of a block layer, a busy/idle status of the storage device, a busy/idle status of an application layer, and a probability that the IO busy/idle status at the current moment is the busy state.

The processor 103 is specifically configured to determine the IO busy/idle status based on the busy/idle status of the block layer, the busy/idle status of the storage device, the busy/idle status of the application layer, and the probability that the IO busy/idle status at the current moment is the busy state.

Further, if there is not the IO instruction of the scheduling queue of the block layer in the first time period, the busy/idle status of the block layer is the idle state; or if there is the IO instruction of the scheduling queue of the block layer in the first time period, the busy/idle status of the block layer is the busy state, where an initial moment of the first time period is the current moment, and lasting duration of the first time period is a first time threshold. If there is not an IO instruction of a scheduling queue of the storage device in a second time period, the busy/idle status of the storage device is the idle state; or if there is an IO instruction of a scheduling queue of the storage device in a second time period, the busy/idle status of the storage device is the busy state, where an initial moment of the second time period is the current moment, and lasting duration of the second time period is a second time threshold. If the application layer does not invoke, in a third time period, an interface of a file system that generates an IO instruction, the busy/idle status of the application layer is the idle state; or if the application layer invokes, in a third time period, an interface of a file system that generates an IO instruction, the busy/idle status of the application layer is the busy state, where an initial moment of the third time period is the current moment, and lasting duration of the third time period is a third time threshold. The probability that the IO busy/idle status at the current moment is the busy state is equal to a weighted sum of three degrees: a historical IO busy degree, an average IO busy degree, and a current-moment IO busy degree.

Further, if the busy/idle status of the block layer is the idle state, the busy/idle status of the storage device is the idle state, the busy/idle status of the application layer is the idle state, and the probability that the IO busy/idle status at the current moment is the busy state is greater than a first probability threshold, the IO busy/idle status is the idle state; or if at least one of the busy/idle status of the block layer, the busy/idle status of the storage device, and the busy/idle status of the application layer is the busy state, and/or the probability that the IO busy/idle status at the current moment is the busy state is less than a first probability threshold, the IO busy/idle status is the busy state.

Further, the processor 103 is further configured to obtain a policy set, where the policy set includes one or more of the following sub-policies: a quantity of discard messages sent at a single time, a granularity lower limit of the sent discard message, a sending interval between the discard messages sent twice, whether sending the discard message again needs to wait for the storage device to complete processing the discard message sent previously, and a priority of sending the discard message.

The processor 103 is specifically configured to deliver the discard message to the storage device based on the policy set.

Further, the processor 103 is further configured to obtain a space status of a file system and a space status of the storage device, where the space status includes an idle state and a non-idle state.

The processor 103 is specifically configured to obtain the policy set based on the space status of the file system and the space status of the storage device.

Further, if a ratio of remaining continuous available physical space of the file system to remaining available physical space of the file system is greater than a first idle threshold, the space status of the file system is the idle state; or if a ratio of remaining continuous available physical space of the file system to remaining available physical space of the file system is less than a first idle threshold, the space status of the file system is the non-idle state. If a ratio of actually available physical space of the storage device to all physical space of the storage device is greater than a second idle threshold, the space status of the storage device is the idle state; or if a ratio of actually available physical space of the storage device to all physical space of the storage device is less than a second idle threshold, the space status of the storage device is the non-idle state, and the actually available physical space of the storage device is equal to remaining physical space obtained after physical space that needs to be discarded is subtracted from the remaining available physical space of the file system.

Further, if the space status of the file system is the idle state, and the space status of the storage device is the idle state, the quantity of discard messages sent at the single time is X, the granularity lower limit of the sent discard message is a first granularity, the sending interval between the discard messages sent twice is first duration, sending the discard message again needs to wait for the storage device to complete processing the discard message sent previously, and the priority of sending the discard message is a first priority. If the space status of the file system is the non-idle state, and the space status of the storage device is the idle state, or if the space status of the file system is the idle state, and the space status of the storage device is the non-idle state, the quantity of discard messages sent at the single time is Y, the granularity lower limit of the sent discard message is a second granularity, the sending interval between the discard messages sent twice is second duration, sending the discard message again needs to wait for the storage device to complete processing the discard message sent previously, and the priority of sending the discard message is a second priority. If the space status of the file system is the non-idle state, and the space status of the storage device is the non-idle state, the quantity of discard messages sent at the single time is Z, the granularity lower limit of the sent discard message is a third granularity, the sending interval between the discard messages sent twice is third duration, sending the discard message again does not need to wait for the storage device to complete processing the discard message sent previously, and the priority of sending the discard message is a third priority, where X<Y<Z, the first granularity is greater than the second granularity, and the second granularity greater than the third granularity; the first duration is greater than the second duration, and the second duration is greater than the third duration; and the first priority is less than the second priority, and the second priority is less than the third priority.

Further, the processor 103 is further configured to: obtain a life loss of the storage device in each of available granularities, where the available granularity is greater than or equal to the granularity lower limit, and determine a priority of each granularity based on the life loss of the storage device in each granularity.

The processor 103 is specifically configured to send the discard message based on the policy set and the priority of each granularity.

Further, the processor 103 is further configured to: obtain a life loss of the storage device in each of available granularities, where the available granularity is a preset granularity, and determine a priority of each granularity based on the life loss of the storage device in each granularity.

The processor 103 is specifically configured to send the discard message based on the priority of each granularity.

Further, a smaller ratio of the life loss of the storage device in the granularity to the granularity indicates a higher priority of the granularity; or a larger difference between a life loss threshold and the life loss of the storage device in the granularity indicates a higher priority of the granularity.

The power supply 105 may be a battery, and is logically connected to the processor 103 by using a power management system, to implement functions such as charging, discharging, and power consumption management by using the power management system.

The RF circuit 106 may be configured to receive and send a signal in an information receiving and sending process or a call process. Particularly, the RF circuit 106 sends received downlink information of a base station to the processor 103 for processing, and sends related uplink data to the base station. Usually, the RF circuit 106 includes but is not limited to an antenna, at least one amplifier, a transceiver, a coupler, a low noise amplifier (Low Noise Amplifier, LNA), a duplexer, and the like. In addition, the RF circuit 106 may further communicate with a network and another device through wireless communication. The wireless communication may use any one communications standard or protocol, including one of or a combination of the following: a global system for mobile communications (Global System for Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

The mobile phone may further include at least one sensor 107, such as an optical sensor, a speed sensor, a global positioning system (Global Positioning System, GPS) sensor, and another sensor. Specifically, the optical sensor may include an ambient light sensor and a proximity sensor. The ambient light sensor may adjust luminance of the display panel 1011 based on brightness of ambient light. The proximity sensor may switch off the display panel 1011 and/or backlight when the mobile phone approaches an ear. As one type of speed sensor, an accelerometer sensor may detect values of acceleration of the mobile phone in various directions (usually in three axes), may detect a value and a direction of gravity when the mobile phone is stationary, and may be used in an application for identifying a mobile phone gesture (for example, screen switching between a landscape mode and a portrait mode, a related game, and magnetometer gesture calibration), a function related to vibration identification (for example, a pedometer or a knock), and the like. Other sensors such as a gyroscope, a barometer, a hygrometer, a thermometer, an infrared sensor, and a pressure sensor may be further configured in the mobile phone. Details are not described herein again.

The audio circuit 108, the speaker 109, and the microphone 110 may provide an audio interface between the user and the mobile phone. The audio circuit 108 may convert received audio data into an electrical signal and transmit the electrical signal to the speaker 109. The speaker 109 converts the electrical signal into a sound signal for output. In addition, the microphone 110 converts a collected sound signal into an electrical signal. The audio circuit 108 receives the electrical signal, converts the electrical signal into audio data, and then outputs the audio data to the RF circuit 106 to send to, for example, another mobile phone, or outputs the audio data to the processor 103 for further processing.

The WiFi module 111 may be a module including a WiFi chip and a driver of the WiFi chip. The WiFi chip is capable of running a wireless Internet standard protocol.

In addition, although not shown, the mobile phone may further include components such as a Bluetooth module and a camera. The Bluetooth module is a printed circuit board assembly (Printed Circuit Board Assembly, PCBA) integrated with a Bluetooth function, configured for short-distance wireless communication.

In addition, an operating system is run on the foregoing components. An application program may be installed and run on the operating system. The operating system may be an Android (Android) operating system, or may be another operating system. This is not specifically limited in this embodiment of this application.

Figures 2, 3:
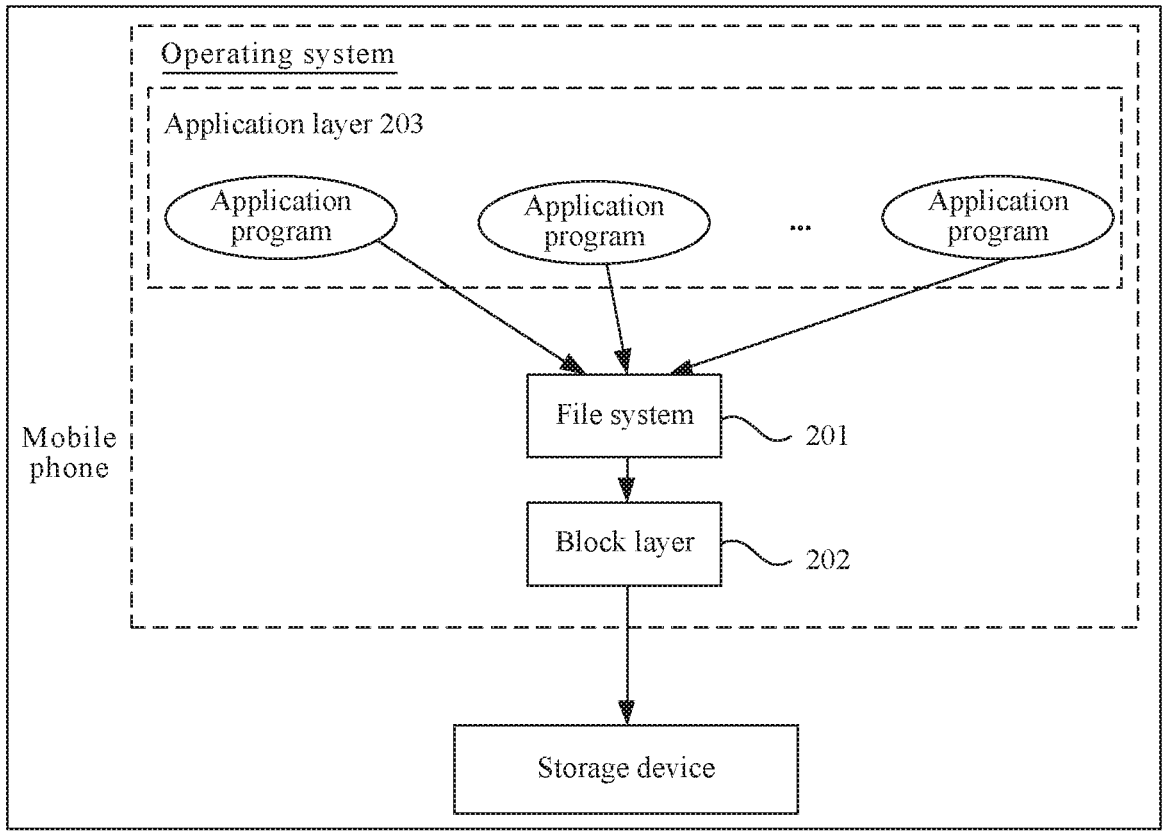
FIG. 2 is a schematic diagram of a logical structure of a mobile phone according to an embodiment of this application.
FIG. 3 is a schematic flowchart of a garbage data scrubbing method according to an embodiment of this application.

FIG. 2 is a schematic diagram of a logical structure of a mobile phone according to an embodiment of this application. As shown in FIG. 2, the operating system of the mobile phone as shown in FIG. 1 may include a file system 201, a block layer 202, and an application layer 203. The application layer 203 includes at least one application program. Each application program is installed in the operating system of the mobile phone.

The file system 201 is a method for storing and organizing user data, and uses an abstract logic concept of a file and a tree directory to replace a concept of a storage device using a data block, to provide convenience for user access and file lookup. The file system 201 is an important component of the operating system of the mobile phone, and is configured to control access of data stored in the storage device of the mobile phone. In the mobile phone, the file system 201 provides a segment of continuous logical space for an application program. The application program may randomly access the file system 201 in the continuous logical space. The file system 201 divides the continuous logical space into blocks, and maps, in a unit of a block, the continuous logical space to the physical space provided by the storage device. In other words, logical space of the file system 201 is reorganization and mapping of the physical space provided by the storage device. The mobile phone stores a mapping relationship between logical space of a particular file and physical space of the particular file.

The block layer 202 shields a difference on different device interfaces, provides, for the file system 201 or the application layer 203, a uniform general layer interface for accessing the storage device, provides an IO scheduling capability, and can perform distribution, management, and control on IO instructions of different priorities based on a scheduling policy.

The application program included in the application layer 203 may be an application program built in the mobile phone, or may be an application program provided by a third party service provider voluntarily installed by a user. This is not specifically limited in this embodiment of this application. Each application program may be run on the foregoing processor 103. During running, each application program may access, by using the file system 201 and the block layer 202, the data stored in the storage device.

FIG. 3 is a flowchart of a garbage data scrubbing method according to an embodiment of this application. As shown in FIG. 3, the method may include the following steps.

S301. A processor of a terminal obtains an IO busy/idle status of the terminal at a current moment, where the IO busy/idle status includes a busy state and an idle state.

The IO busy/idle status is a state of requesting to process an IO instruction at the current moment, that is, a state whether there is an IO instruction of the terminal being processed at the current moment. If there is the IO instruction of the terminal being processed at the current moment, the IO busy/idle status is considered to be the busy state. If there is not the IO instruction of the terminal being processed at the current moment, the IO busy/idle status is considered to be the idle state.

When a file system or an application program of the terminal no longer uses data of a particular physical interval in a storage device, for example, the application program deletes a file, the file system may mark a logical address corresponding to the file as an "already deleted" state or an "idle" state. In addition, the processor of the terminal may obtain an initial address and a size of corresponding physical space based on a logical address and a mapping relationship that are corresponding to the file, and store the initial address and the size of the corresponding physical space in a discard cache. In specific implementations, the processor of the terminal may execute code of the file system of the terminal, obtain the initial address and the size of the corresponding physical space based on the logical address and the mapping relationship that are corresponding to the file, and store the initial address and the size of the corresponding physical space in the discard cache.

The discard cache is used to store initial addresses and sizes of all to-be-scrubbed physical space. The to-be-scrubbed physical space is physical space storing garbage data. The garbage data is data that is already marked as an invalid state on a file system side but is still valid on a storage device side.

To avoid a collision generated between a delivered discard message and a user foreground operation and affecting a normal user operation, before sending the discard message, the processor of the terminal may first obtain the IO busy/idle status of the terminal at the current moment.

S302. If the IO busy/idle status of the terminal at the current moment is the idle state, the processor of the terminal delivers a discard (Discard) message to a storage device of the terminal.

The discard (Discard) message may include an initial address and a size of to-be-scrubbed physical space in the storage device, and is used to unbind a mapping relationship between a physical address of the to-be-scrubbed physical space and a corresponding logical address.

When determining that the IO busy/idle status of the terminal at the current moment is the idle state, the processor of the terminal may deliver, to the storage device of the terminal based on a cache state of the discard cache, the discard message by setting a task (such as a kernel thread separately created or an operating queue separately created) in the background, or by using a specific interface, to scrub garbage data in the corresponding physical space. When determining that the IO busy/idle status of the terminal at the current moment is the busy state, the processor of the terminal may re-obtain the IO busy/idle status of the terminal after a preset time until the terminal completes sending the discard message when determining that the IO busy/idle status is the idle state.

In some embodiments, S301 may specifically be that the processor of the terminal determines the IO busy/idle status based on whether there is an IO instruction of a scheduling queue of a block layer in a first time period. If there is not the IO instruction of the scheduling queue of the block layer in the first time period, the IO busy/idle status is the idle state; or if there is the IO instruction of the scheduling queue of the block layer in the first time period, the IO busy/idle status is the busy state. An initial moment of the first time period is the current moment, and lasting duration of the first time period is a first time threshold. The first time threshold may be preset, or may be dynamically set by a user based on an actual scenario requirement. This is not specifically limited in this embodiment of this application. For example, the first time period may be a time period starting from the current moment and having duration of 0 to 5 s.

Figure 4:
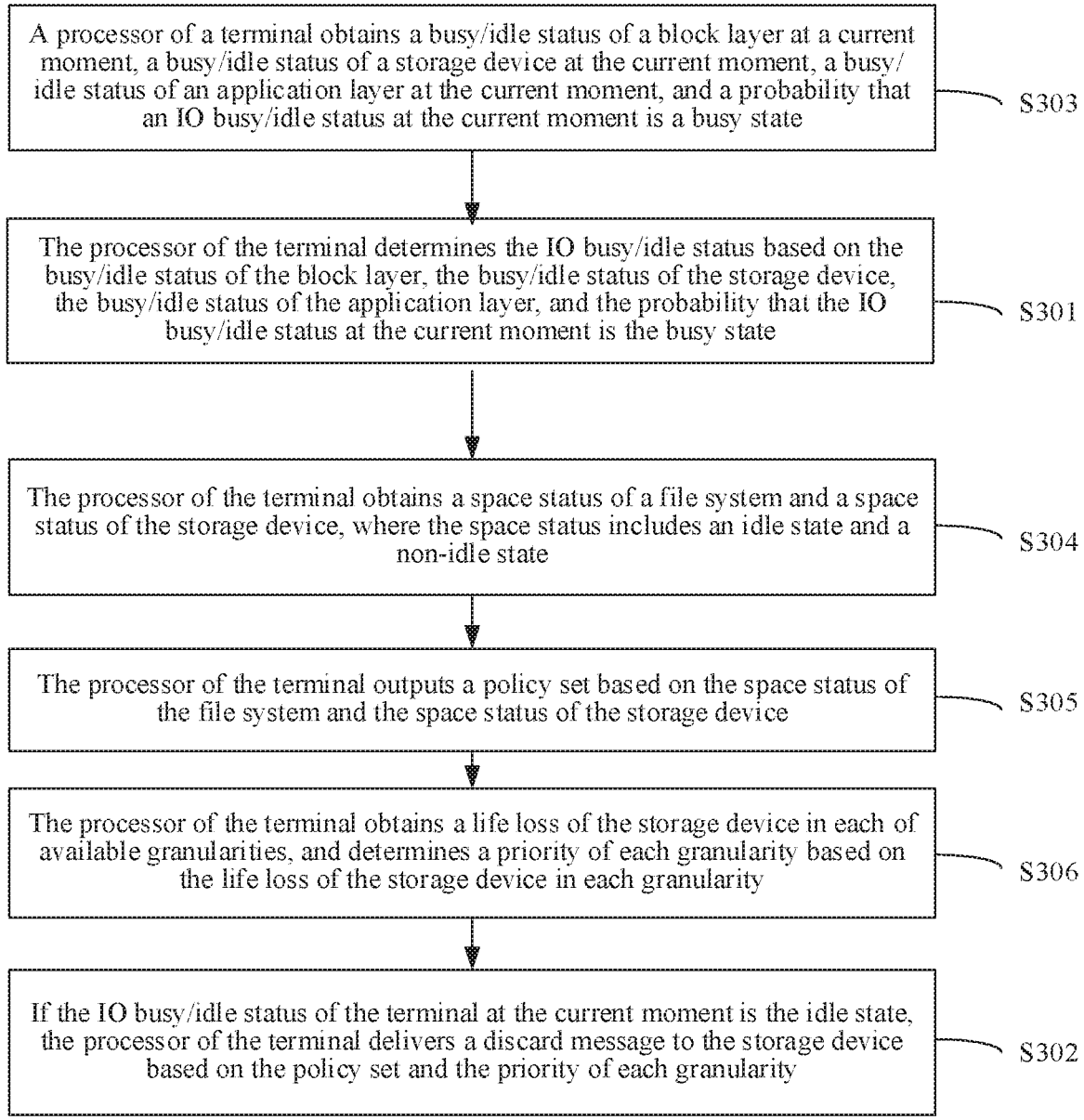
FIG. 4 is a schematic flowchart of another garbage data scrubbing method according to an embodiment of this application.

In some other embodiments, as shown in FIG. 4, before S301, the garbage data scrubbing method provided in this embodiment of this application may further include the following step: S303. The processor of the terminal obtains a busy/idle status of a block layer at a current moment, a busy/idle status of the storage device at the current moment, a busy/idle status of an application layer at the current moment, and a probability that the IO busy/idle status at the current moment is the busy state.

In this case, S301 may be specifically replaced as follows: The processor of the terminal determines the IO busy/idle status based on the busy/idle status of the block layer, the busy/idle status of the storage device, the busy/idle status of the application layer, and the probability that the IO busy/idle status at the current moment is the busy state.

The processor may obtain the busy/idle status of the block layer at the current moment based on whether there is the IO instruction of the scheduling queue of the block layer in the first time period. Specifically, if there is not the IO instruction of the scheduling queue of the block layer in the first time period, the busy/idle status of the block layer at the current moment is the idle state; or if there is the IO instruction of the scheduling queue of the block layer in the first time period, the busy/idle status of the block layer at the current moment is the busy state. An initial moment of the first time period is the current moment, and lasting duration of the first time period is a first time threshold. For example, the first time period may be a time period starting from the current moment and having duration of 0 to 5 s.

The processor may obtain the busy/idle status of the storage device at the current moment based on whether there is an IO instruction of a scheduling queue of the storage device in a second time period. Specifically, if there is not the IO instruction of the scheduling queue of the storage device in the second time period, the busy/idle status of the storage device at the current moment is the idle state; or if there is the IO instruction of the scheduling queue of the storage device in the second time period, the busy/idle status of the storage device at the current moment is the busy state. An initial moment of the second time period is the current moment, and lasting duration of the second time period is a second time threshold. The second time threshold may be preset, or may be dynamically set by the user based on an actual scenario requirement. This is not specifically limited in this embodiment of this application. For example, the second time period may be a time period starting from the current moment and having duration of 0 to 5 s.

The processor may obtain the busy/idle status of the application layer at the current moment based on whether the application layer invokes, in a third time period, an interface of a file system that generates an IO instruction. Specifically, if the application layer does not invoke, in the third time period, the interface of the file system that generates the IO instruction, the busy/idle status of the application layer at the current moment is the idle state; or if the application layer invokes, in the third time period, the interface of the file system that generates the IO instruction, the busy/idle status of the application layer at the current moment is the busy state. An initial moment of the third time period is the current moment, and lasting duration of the third time period is a third time threshold. The third time threshold may be preset, or may be dynamically set by the user based on an actual scenario requirement. This is not specifically limited in this embodiment of this application. For example, the third time period may be a time period starting from the current moment and having duration of 0 to 5 s.

The processor may determine, based on a historical IO busy degree, an average IO busy degree, and a current-moment IO busy degree, the probability that the IO busy/idle status at the current moment is the busy state. The probability that the IO busy/idle status at the current moment is the busy state is equal to a weighted sum of the three degrees: the historical IO busy degree, the average IO busy degree, and the current-moment IO busy degree.

For example, the historical IO busy degree may mean a probability that the user has an IO operation within 24 hours (or 24*n hours, where n is an integer greater than 1) before the current moment. The average IO busy degree may mean a probability that the user has the IO operation in a terminal use process, for example, a probability that the user has the IO operation in a terminal screen-on process or a probability that the user has the IO operation in a music listening process. The current-moment IO busy degree may mean a probability that the user has the IO operation within 5 seconds (or 5*m seconds, where m is an integer greater than 1) before the current moment. A case in which the user has the IO operation at a specific moment may be recorded and stored in the terminal in the user terminal use process. For example, a weight of the average IO busy degree is a1, a weight of the historical IO busy degree is a2, and a weight of the current-moment IO busy degree is a3. Therefore, the probability that the IO busy/idle status at the current moment is the busy state=(the average IO busy degree)*a1+(the historical IO busy degree)*a2+(the current-moment IO busy degree)*a3.

After obtaining the busy/idle status of the block layer at the current moment, the busy/idle status of the storage device at the current moment, the busy/idle status of the application layer at the current moment, and the probability that the IO busy/idle status at the current moment is the busy state, the processor of the terminal may determine the IO busy/idle status based on the busy/idle status of the block layer, the busy/idle status of the storage device, the busy/idle status of the application layer, and the probability that the IO busy/idle status at the current moment is the busy state.

If the busy/idle status of the block layer is the idle state, the busy/idle status of the storage device is the idle state, the busy/idle status of the application layer is the idle state, and the probability that the IO busy/idle status at the current moment is the busy state is greater than a first probability threshold, the IO busy/idle status is the idle state; or if at least one of the busy/idle status of the block layer, the busy/idle status of the storage device, and the busy/idle status of the application layer is the busy state, and/or the probability that the IO busy/idle status at the current moment is the busy state is less than a first probability threshold, the IO busy/idle status is the busy state. The first probability threshold may be preset, or may be dynamically set by the user based on an actual scenario requirement. This is not specifically limited in this embodiment of this application. For example, a possible value range of the first probability threshold is 0 to 50%.

In S302 in this embodiment of this application, the discard message may be sent in an asynchronous serial manner. To be specific, after sending a discard message, the processor starts to synchronously wait. After the storage device side completes processing, the processor is notified that the processing is already completed. The processor then sends a next discard message until processing of the to-be-scrubbed physical space stored in the discard cache is completed.

Further, to use, to a larger extent, a capability of the storage device to process the discard message, and scrub the garbage data in the storage device in a timely manner, thereby recovering performance of the storage device and reducing impact on a storage device life, before the discard message is delivered to the storage device, as shown in FIG. 4, the garbage data scrubbing method provided in this embodiment of this application may further include the following steps S304 and S305.

S304. The processor of the terminal obtains a space status of a file system and a space status of the storage device, where the space status includes an idle state and a non-idle state.

The space status of the file system is an available space status of the file system. The space status of the storage device is an available space status of the storage device.

When available physical space of the file system and available physical space of the storage device become less, if the storage device does not scrub the garbage data in a timely manner, the performance of the storage device is rapidly degraded. Therefore, in this embodiment of this application, a rate, a granularity, and a priority of sending the discard message to the storage device may be adjusted by perceiving the space status of the file system and the space status of the storage device.

If a ratio of remaining continuous available physical space of the file system to remaining available physical space of the file system is greater than a first idle threshold, the space status of the file system is the idle state; or if a ratio of remaining continuous available physical space of the file system to remaining available physical space of the file system is less than a first idle threshold, the space status of the file system is the non-idle state. The first idle threshold may be preset, or may be dynamically set by the user based on an actual scenario requirement. This is not specifically limited in this embodiment of this application. For example, a possible value range of the first idle threshold is 0 to 30%.

If a ratio of actually available physical space of the storage device to all physical space of the storage device is greater than a second idle threshold, the space status of the storage device is the idle state; or if a ratio of actually available physical space of the storage device to all physical space of the storage device is less than a second idle threshold, the space status of the storage device is the non-idle state, and the actually available physical space of the storage device is equal to remaining physical space obtained after physical space that needs to be discarded is subtracted from the remaining available physical space of the file system. The second idle threshold may be preset, or may be dynamically set by the user based on an actual scenario requirement. This is not specifically limited in this embodiment of this application. For example, a possible value range of the first idle threshold is 0 to 20%.

For example, it is assumed that all the physical space of the storage device is 10 gigabytes (GB), the first idle threshold is 30%, and the second idle threshold is 20%. For example, a size of the remaining continuous available physical space of the file system is 2 GB, and a size of the remaining available physical space of the file system is 5 GB. Because 2 GB/5 GB=40%>the first idle threshold 30%, it may be obtained that the space status of the file system is the idle state. For example, the physical space that needs to be discarded is 1 GB, and the actually available physical space of the storage device=5 GB-1 GB=4 GB. Because 4 GB/10 GB=40%>20%, it may be obtained that the space status of the storage device is the idle state.

S305. The processor of the terminal outputs a policy set based on the space status of the file system and the space status of the storage device.

In this embodiment of this application, the policy set may include one or more of the following sub-policies: a quantity of discard messages sent at a single time, a granularity lower limit of the sent discard message, a sending interval between the discard messages sent twice, whether sending the discard message again needs to wait for the storage device to complete processing the discard message sent previously, and a priority of sending the discard message.

When the space status of the file system and the space status of the storage device are both the idle state, it indicates that the available physical space of the file system and the available physical space of the storage device can satisfy a user use requirement. In this case, the discard message with a large granularity may be sent to the storage device by using a low rate. When the space status of the file system and the space status of the storage device are both the non-idle state, it indicates that the available physical space of the file system and the available physical space of the storage device cannot satisfy a user use requirement. In this case, the discard message with a small granularity may be sent to the storage device by using a high rate, so that garbage data scrubbing can be implemented rapidly, and the performance of the storage device can be recovered in a timely manner. The rate of sending the discard message may be controlled by using the quantity of discard messages sent at the single time and the sending interval between the discard messages sent twice.

For example, if the space status of the file system is the idle state, and the space status of the storage device is the idle state, the sub-policies included in the policy set may be specifically as follows: The quantity of discard messages sent at the single time is X, the granularity lower limit of the sent discard message is a first granularity, the sending interval between the discard messages sent twice is first duration, sending the discard message again needs to wait for the storage device to complete processing the discard message sent previously, and the priority of sending the discard message is a first priority. The granularity of the discard message means a minimum value of a discard message length.

If the space status of the file system is the non-idle state, and the space status of the storage device is the idle state, or if the space status of the file system is the idle state, and the space status of the storage device is the non-idle state, the sub-policies included in the policy set may be specifically as follows: The quantity of discard messages sent at the single time is Y the granularity lower limit of the sent discard message is a second granularity, the sending interval between the discard messages sent twice is second duration, sending the discard message again needs to wait for the storage device to complete processing the discard message sent previously, and the priority of sending the discard message is a second priority.

If the space status of the file system is the non-idle state, and the space status of the storage device is the non-idle state, the sub-policies included in the policy set may be specifically as follows: The quantity of discard messages sent at the single time is Z, the granularity lower limit of the sent discard message is a third granularity, the sending interval between the discard messages sent twice is third duration, sending the discard message again does not need to wait for the storage device to complete processing the discard message sent previously, and the priority of sending the discard message is a third priority, where X<Y<Z, the first granularity is greater than the second granularity, and the second granularity is greater than the third granularity. The first duration is greater than the second duration, and the second duration is greater than the third duration. The first priority is less than the second priority, and the second priority is less than the third priority.

For example, a possible value range of X is 1 to 4, a possible value range of Y is 1 to 8, and a possible value range of Z is 1 to 32. A possible value range of the first granularity is greater than or equal to 2 megabytes (MB). A possible value range of the second granularity is greater than or equal to 64 kilobytes (KB). A possible value range of the third granularity is greater than or equal to 4 KB. A possible value range of the first duration is 0 to 5 s. A possible value range of the second duration is 0 to 2 s. A possible value range of the third duration is 0 to 500 ms.

In this case, S302 may be specifically replaced as follows: If the IO busy/idle status of the terminal at the current moment is the idle state, the processor of the terminal delivers a discard message to the storage device based on the policy set.

For example, the policy set is output based on the space status of the file system and the space status of the storage device as follows: The quantity of discard messages sent at the single time is 2, the granularity lower limit of the sent discard message is 2 MB, the sending interval between the discard messages sent twice is 100 s, sending the discard message again needs to wait for the storage device to complete processing the discard message sent previously, and the priority of sending the discard message is low. Assuming that a maximum size of the to-be-scrubbed physical space stored in the discard cache is 64 GB, when the IO busy/idle status of the terminal at the current moment is the idle state, the processor of the terminal may first instruct, based on the policy set, the storage device to scrub physical space with a size of 64 GB. That is, the processor simultaneously sends a discard message 1 and a discard message 2 to the processor. A size of to-be-scrubbed physical space included in the discard message 1 and the discard message 2 is 64 GB. After the storage device completes processing the discard message 1 and the discard message 2, an interval of 100 s later, the processor simultaneously sends a discard message 3 and a discard message 4 to the storage device. A granularity of the sent discard message may be sequentially reduced. Assuming that after the discard message 1 and the discard message 2 are sent, and a maximum size of the to-be-scrubbed physical space stored in the discard cache is 16 GB, the processor may then instruct the storage device to scrub physical space with a size of 16 GB. That is, a size of to-be-scrubbed physical space included in the discard message 3 and the discard message 4 is 16 GB. A similar process proceeds until the granularity of the discard message is reduced to 2 MB. In addition, in a process of sending the discard message, if a user foreground operation is detected, the processor may suspend sending of the discard message.

Further, in this embodiment of this application, discard messages with various granularities cause different life losses of the storage device. Therefore, before sending discard messages with different granularities, the processor may determine priorities of the different granularities based on life losses of the storage device caused by the different granularities. As shown in FIG. 4, before S302, the method may further include the following step:

S306. The processor of the terminal obtains a life loss of the storage device in each of available granularities, and determines a priority of each granularity based on the life loss of the storage device in each granularity.

The life loss of the storage device in a particular granularity may mean a quantity of erasing times of a minimum erasure/writing unit used after the storage device processes a discard message with the granularity. The available granularity is greater than or equal to the granularity lower limit in S305. The life loss of the storage device in each granularity may be obtained through statistics. For example, statistical logic may be added to the storage device. For each granularity, a historical loss of the storage device caused by the discard message with the granularity is obtained through statistics, so that the life loss of the storage device in the granularity is obtained. A higher priority of a granularity indicates a smaller life loss of the storage device.

For example, all available granularities may be traversed, and a ratio of the life loss of the storage device in each granularity to the granularity is obtained. A smaller obtained ratio indicates a higher priority of the granularity. Alternatively, all available granularities may be traversed, and a difference between a life loss threshold corresponding to each granularity and the life loss of the storage device in the granularity is obtained. A larger difference indicates a higher priority of the granularity. Life loss thresholds corresponding to the different granularities may be the same, or may be different.

For example, the granularity lower limit is 4 KB, and the available granularities are 4 KB, 64 KB, 2 MB, and 8 MB. Correspondences between the different granularities and the life loss thresholds are shown in Table 1.

TABLE 1

| Granularity | Life loss threshold |
| --- | --- |
| 4 KB | 5 |
| 64 KB | 7 |
| 2 MB | 7 |
| 8 MB | 6 |

Assuming that when the granularity of the sent discard message obtained through statistics is 4 KB, the life loss of the storage device is 5; when the granularity of the sent discard message obtained through statistics is 64 KB, the life loss of the storage device is 6; when the granularity of the sent discard message obtained through statistics is 2 MB, the life loss of the storage device is 8; and when the granularity of the sent discard message obtained through statistics is 8 MB, the life loss of the storage device is 4, with reference to Table. 1, it can be obtained that when the granularities of the sent discard message are respectively 4 KB, 64 KB, 2 MB, and 8 MB, corresponding differences between the life loss thresholds and the life losses of the storage device in the granularities are respectively 0, 1, −1, and 2. It can be obtained that priorities of the available granularities are sorted in descending order as 8 MB, 64 KB, 4 KB, and 2 MB.

After the priorities of the available granularities are determined, the discard message may be sent based on both the policy set and the priority of each granularity. To be specific, a discard message with a granularity of a high priority is first sent, and a discard message with a granularity of a low priority is then sent.

In this embodiment of this application, impact of the discard messages with the different granularities on the life loss of the storage device may alternatively be only considered. Before the discard message is delivered to the storage device, the priority of each granularity is determined based on the life loss of the storage device in each of the obtained available granularities, and then the discard message is sent based on the priority of each granularity. The available granularity may be a preset granularity. For example, preset granularities are 4 KB, 8 KB, 16 KB, 2 MB, and 4 MB. Assuming that priorities of the preset granularities are sorted in descending order as 2 MB, 8 KB, 4 KB, 16 KB, and 4 MB, the processor may send the discard messages with the different granularities to the storage device based on the descending order of the priorities.

In the garbage data scrubbing method provided in this embodiment of this application, when the IO busy/idle status of the terminal at the current moment is the idle state, the discard message is delivered to the storage device, so that the garbage data is scrubbed in a timely manner without affecting a normal user foreground operation. In addition, by delivering the discard message in parallel, the capability of the storage device to process the discard message is used to a larger extent, to improve a garbage data scrubbing speed. The rate and the granularity of delivering the discard message is dynamically adjusted and rapid recovery of storage device performance is implemented by perceiving the space status of the file system and the space status of the storage device. In addition, the discard message is delivered based on priorities of various granularities, to reduce a life loss speed of the storage device.

It should be noted that, in another embodiment of this application, the policy set for sending the discard message may be determined based only on the space status of the file system and/or the space status of the storage device. In other words, the discard message is delivered to the storage device based only on the space status of the file system and/or the space status of the storage device. Further, how to send the discard message may be determined based on the IO busy/idle status of the terminal and/or the priority of each of the available granularities. In still another embodiment of this application, the discard message may be sent to the storage device based only on the priority of each of the available granularities. Further, how to send the discard message may be determined based on one or more of the space status of the file system, the space status of the storage device, and the IO busy/idle status of the terminal. Specific implementations of the two embodiments are similar to specific implementations in the garbage data scrubbing method shown in FIG. 3 and FIG. 4. Details are not described in this embodiment of this application again.

In the embodiments of this application, function modules of the foregoing terminal, and the like may be divided based on the foregoing method examples. For example, various function modules may be divided corresponding to various functions, or two or more functions may be integrated into one processing module. The foregoing integrated module may be implemented in a form of hardware, or may be implemented in a form of a software function module. It should be noted that, in the embodiments of this application, module division is used as an example, and is merely logical function division. In actual implementation, another division manner may be used.

Figure 5:
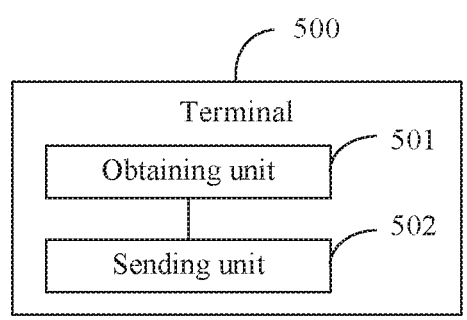
FIG. 5 is a schematic diagram of composition of a terminal according to an embodiment of this application.

When various function modules are divided corresponding to various functions, FIG. 5 shows a possible schematic structural diagram of a terminal 500 provided in the foregoing embodiment. The terminal 500 may include an obtaining unit 501 and a sending unit 502.

The obtaining unit 501 is configured to support the terminal 500 in performing S301, S303, S304, S305, and S306 in the foregoing method embodiment, and/or another process used for the technology described in this specification.

The sending unit 502 is configured to support the terminal 500 in performing S302 in the foregoing method embodiment, and/or another process used for the technology described in this specification.

All content related to the steps in the foregoing method embodiment may be cited to function descriptions of corresponding function modules. Details are not described herein again.

Certainly, the terminal includes but is not limited to the unit module enumerated above. For example, the terminal may further include a storage unit. The storage unit is configured to store related data of the terminal, for example, store initial addresses and sizes of all to-be-scrubbed physical space. In addition, functions that can be specifically implemented by the foregoing function unit also include but are not limited to functions corresponding to the method steps in the foregoing embodiments. For a detailed description of another unit of the terminal, refer to a detailed description of a method step corresponding to the another unit of the terminal. Details are not described in an embodiment of this application again.

Figure 6:
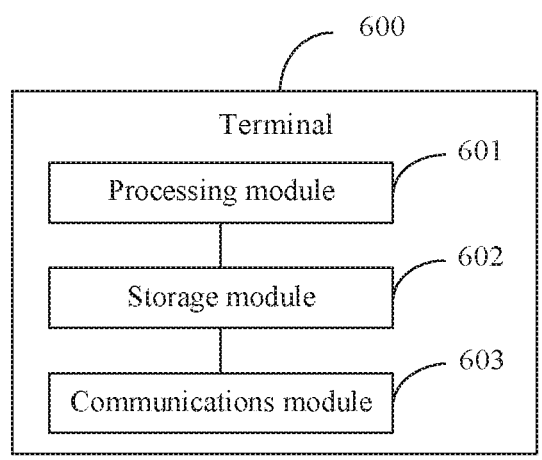
FIG. 6 is a schematic diagram of composition of another terminal according to an embodiment of this application.

FIG. 6 shows a possible schematic structural diagram of a terminal 600 provided in the foregoing embodiment. The terminal 600 may include a processing module 601, a storage module 602, and a communications module 603. The processing module 601 is configured to control and manage an action of the terminal 600. The storage module 602 is configured to store an operating system file, an executable file, and other user data of the terminal 600. The communications module 603 is configured to support communication between the terminal 600 and another network entity.

The processing module 601 may be a processor or a controller. The communications module 603 may be a transceiver, an RF circuit, a communications interface, or the like. The storage module 602 may be a memory.

When the processor module 601 is the processor, the communications module 603 is the RF circuit, and the storage module 602 is the memory, the terminal 600 provided in an embodiment of this application may be the mobile phone shown in FIG. 1. The foregoing communications module 603 may include the RF circuit, and may further include a WiFi module and a Bluetooth module. Communications modules such as the RF circuit, the WiFi module, and the Bluetooth module may be collectively referred to as communications interfaces. The processor, the RF circuit, a touchscreen, and the memory may be coupled to each other through a bus.

An embodiment of this application further provides a computer program product. When the computer program product is run on a computer, the computer is enabled to perform the related method steps in any figure in FIG. 3 and FIG. 4, to implement the garbage data scrubbing method in the foregoing embodiment.

The terminal, the computer storage medium, or the computer program product provided in the embodiments of this application is configured to perform the corresponding method provided above. Therefore, for beneficial effects achieved by the terminal, the computer storage medium, or the computer program product, refer to beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different functional modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiment. Details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the method described in the embodiments of this application. The foregoing storage medium includes: various media that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A garbage data scrubbing method, implemented by a terminal, wherein the terminal comprises a storage device, and wherein the garbage data scrubbing method comprises:
   obtaining an input output (TO) busy/idle status of the terminal at a current moment, wherein the IO busy/idle status comprises a busy state or an idle state; and
   delivering a discard message to the storage device when the IO busy/idle status of the terminal at the current moment is the idle state, wherein the discard message comprises an initial address and a size of to-be-scrubbed physical space in the storage device, and wherein the discard message is for unbinding a mapping relationship between a physical address of the to-be-scrubbed physical space and a corresponding logical address,
   wherein before the obtaining, by the terminal, the input output IO busy/idle status of the terminal at the current moment, the garbage data scrubbing method further comprises obtaining a busy/idle status of a block layer, a busy/idle status of the storage device, a busy/idle status of an application layer, and a probability that the IO busy/idle status at the current moment is the busy state, and
   wherein the obtaining, by the terminal, the input output IO busy/idle status of the terminal at the current moment comprises determining the IO busy/idle status based on the busy/idle status of the block layer, the busy/idle status of the storage device, the busy/idle status of the application layer, and the probability.

2. The garbage data scrubbing method of claim 1, further comprising determining the IO busy/idle status based on whether an IO instruction of a scheduling queue of a block layer is in a first time period, wherein an initial moment of the first time period is the current moment, and wherein a duration of the first time period is a first time threshold.

3. The garbage data scrubbing method of claim 1, wherein the IO busy/idle status is the idle state when the busy/idle status of the block layer is the idle state, the busy/idle status of the storage device is the idle state, the busy/idle status of the application layer is the idle state, and the probability is greater than a first probability threshold.

4. The garbage data scrubbing method of claim 1, further comprising:
   obtaining a policy set, wherein the policy set comprises one or more of the following sub-policies a quantity of discard messages sent at a single time, a granularity lower limit of the discard message, a sending interval between the discard messages sent twice, whether sending the discard message again needs to wait for the storage device to complete processing the discard message sent previously, or a priority of sending the discard message; and
   delivering the discard message to the storage device based on the policy set.

5. The garbage data scrubbing method of claim 4, wherein before obtaining the policy set, the garbage data scrubbing method further comprises:
   obtaining a first space status of a file system and a second space status of the storage device, wherein the first space status and the second space status comprise the idle state and a non-idle state; and
   obtaining the policy set based on the space status of the file system and the space status of the storage device.

6. The garbage data scrubbing method of claim 4, further comprising:
obtaining a life loss of the storage device in each available granularity, wherein the available granularity is greater than or equal to the granularity lower limit;
determining a priority of each granularity based on the life loss of the storage device in each granularity; and
sending the discard message based on the policy set and the priority of each granularity.

7. The garbage data scrubbing method of claim 1, further comprising:
obtaining a life loss of the storage device in each available granularity, wherein the available granularity is a preset granularity;
determining a priority of each granularity based on the life loss of the storage device in each granularity; and
sending the discard message based on the priority of each granularity.

8. A terminal, comprising:
a storage device;
a processor coupled to the storage device; and
a memory coupled to the processor, wherein one or more computer programs are stored in the memory, wherein the one or more computer programs comprise one or more computer instructions, and when the one or more computer instructions are executed by the processor to cause the terminal to be configured to:
obtain an input output (TO) busy/idle status of the terminal at a current moment, wherein the TO busy/idle status comprises a busy state and an idle state;
deliver a discard message to the storage device when the obtained TO busy/idle status of the terminal at the current moment is the idle state, wherein the discard message comprises an initial address and a size of to-be-scrubbed physical space in the storage device, and wherein the discard message is for unbinding a mapping relationship between a physical address of the to-be-scrubbed physical space and a corresponding logical address;
obtain a busy/idle status of a block layer, a busy/idle status of the storage device, a busy/idle status of an application layer, and a probability that the IO busy/idle status at the current moment is the busy state; and
determine the IO busy/idle status based on the busy/idle status of the block layer, the busy/idle status of the storage device, the busy/idle status of the application layer, and the probability that the IO busy/idle status at the current moment is the busy state.

9. The terminal of claim 8, wherein the instructions further cause the terminal to be configured to determine the IO busy/idle status based on whether there is an IO instruction of a scheduling queue of a block layer in a first time period, wherein an initial moment of the first time period is the current moment, and wherein a duration of the first time period is a first time threshold.

10. The terminal of claim 8 wherein the IO busy/idle status is the idle state when the busy/idle status of the block layer is the idle state, the busy/idle status of the storage device is the idle state, the busy/idle status of the application layer is the idle state, and the probability that the IO busy/idle status at the current moment is the busy state is greater than a first probability threshold.

11. The terminal of claim 8, wherein the instructions further cause the terminal to be configured to:
obtain a policy set, wherein the policy set comprises one or more of the following sub-policies a quantity of discard messages sent at a single time, a granularity lower limit of the discard message, a sending interval between the discard messages sent twice, whether sending the discard message again needs to wait for the storage device to complete processing the discard message sent previously, or a priority of sending the discard message; and
deliver the discard message to the storage device based on the policy set.

12. The terminal of claim 11, wherein the instructions further cause the terminal to be configured to:
obtain a first space status of a file system and a second space status of the storage device, wherein the first space status and the second space status comprise the idle state and a non-idle state; and
obtain the policy set based on the space status of the file system and the space status of the storage device.

13. The terminal of claim 11, wherein the instructions further cause the terminal to be configured to:
obtain a life loss of the storage device in each available granularity, wherein the available granularity is greater than or equal to the granularity lower limit;
determine a priority of each granularity based on the life loss of the storage device in each granularity; and
send the discard message based on the policy set and the priority of each granularity.

14. The terminal of claim 8, wherein the instructions further cause the terminal to be configured to:
obtain a life loss of the storage device in each available granularity, wherein the available granularity is a preset granularity;
determine a priority of each granularity based on the life loss of the storage device in each granularity; and
send the discard message based on the priority of each granularity.

15. A computer program product comprising computer-executable instructions stored on a non-transitory computer-readable medium that, when executed by a processor, cause a terminal to:
obtain an input output (TO) busy/idle status of the terminal at a current moment, wherein the IO busy/idle status comprises a busy state and an idle state;
deliver a discard message to a storage device when the IO busy/idle status of the terminal at the current moment is the idle state, wherein the discard message comprises an initial address and a size of to-be-scrubbed physical space in the storage device, and wherein the discard message is configured to unbind a mapping relationship between a physical address of the to-be-scrubbed physical space and a corresponding logical address;
obtain a busy/idle status of a block layer, a busy/idle status of the storage device, a busy/idle status of an application layer, and a probability that the IO busy/idle status at the current moment is the busy state; and
determine the TO busy/idle status based on the busy/idle status of the block layer, the busy/idle status of the storage device, the busy/idle status of the application layer, and the probability that the TO busy/idle status at the current moment is the busy state.

16. The method of claim 1, wherein when at least one of the busy/idle status of the block layer, the busy/idle status of the storage device, and the busy/idle status of the application layer is the busy state, or the probability that the IO busy/idle status at the current moment is the busy state is less than a first probability threshold, then the IO busy/idle status is the busy state.

17. The terminal of claim 8, wherein when at least one of the busy/idle status of the block layer, the busy/idle status of the storage device, and the busy/idle status of the application layer is the busy state, or the probability that the IO busy/idle status at the current moment is the busy state is less than a first probability threshold, then the IO busy/idle status is the busy state.

18. The computer program product of claim 15, wherein the instructions further cause the terminal to determine the IO busy/idle status based on whether an 10 instruction of a scheduling queue of a block layer is in a first time period, wherein an initial moment of the first time period is the current moment, and wherein a duration of the first time period is a first time threshold.

\* \* \* \* \*

UNITED STATES PATENT AND TRADEMARK OFFICE
CERTIFICATE OF CORRECTION

PATENT NO. : 11,126,546 B2  
APPLICATION NO. : 16/754537  
DATED : September 21, 2021  
INVENTOR(S) : Chao Yu et al.

Page 1 of 1

It is certified that error appears in the above-identified patent and that said Letters Patent is hereby corrected as shown below:

In the Claims

Claim 1, Column 32, Line 5: "output (TO)" should read "output (IO)"

Claim 8, Column 33, Line 28: "output (TO)" should read "output (IO)"

Claim 8, Column 33, Line 29: "the TO" should read "the IO"

Claim 8, Column 33, Line 32: "obtained TO" should read "obtained IO"

Claim 15, Column 34, Line 41: "output (TO)" should read "output (IO)"

Claim 15, Column 34, Line 56: "the TO" should read "the IO"

Claim 15, Column 34, Line 59: "the TO" should read "the IO"

Claim 18, Column 35, Line 10: "an 10" should read "an IO"

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*